(12) United States Patent
Vulliet et al.

(10) Patent No.: US 11,181,492 B2
(45) Date of Patent: Nov. 23, 2021

(54) DEVICE, SYSTEM AND METHOD FOR X-RAY DIFFRACTION ANALYSIS OF AN ELECTRODE OF AN ELECTROCHEMICAL CELL, AT OPERATING TEMPERATURE AND UNDER CURRENT

(71) Applicant: COMMISSARIAT À L'ÉNERGIE ATOMIQUE ET AUX ÉNERGIES ALTERNATIVES, Paris (FR)

(72) Inventors: Julien Vulliet, Chambray-les-Tours (FR); Cécile Autret, Saint-Epain (FR); Christophe Honstettre, Esvres-sur-Indre (FR)

(73) Assignee: COMMISSARIAT À L'ÉNERGIE ATOMIQUE ET AUX ÉNERGIES ALTERNATIVES, Paris (FR)

(*) Notice: Subject to any disclaimer, the term of this patent is extended or adjusted under 35 U.S.C. 154(b) by 156 days.

(21) Appl. No.: 16/498,823

(22) PCT Filed: Mar. 29, 2018

(86) PCT No.: PCT/FR2018/050782
§ 371 (c)(1),
(2) Date: Sep. 27, 2019

(87) PCT Pub. No.: WO2018/178583
PCT Pub. Date: Oct. 4, 2018

(65) Prior Publication Data
US 2021/0109043 A1    Apr. 15, 2021

(30) Foreign Application Priority Data

Mar. 31, 2017  (FR) ..................................... 1752782

(51) Int. Cl.
*G01N 23/207* (2018.01)
*G01N 23/20* (2018.01)
(Continued)

(52) U.S. Cl.
CPC ...... *G01N 23/207* (2013.01); *G01N 23/20016* (2013.01); *G01N 23/20033* (2013.01);
(Continued)

(58) Field of Classification Search
CPC .. C25B 1/04; G01N 2223/05; G01N 2223/20; G01N 2223/3106; G01N 2223/317;
(Continued)

(56) References Cited

U.S. PATENT DOCUMENTS

| 5,848,122 | A | 12/1998 | Kurtz |
| 10,403,921 | B2 | 9/2019 | Vulliet |
| 2018/0048005 | A1 | 2/2018 | Vulliet |

FOREIGN PATENT DOCUMENTS

| FR | 3030892 A1 | 6/2016 |
| JP | 2016162587 A | 9/2016 |
| JP | 2016162587 A * | 9/2016 |

OTHER PUBLICATIONS

Search Report for French Application No. FR1752782 dated Oct. 24, 2017.
(Continued)

Primary Examiner — Mark R Gaworecki
(74) Attorney, Agent, or Firm — Pearne & Gordon LLP

(57) ABSTRACT

A device keeps an electrochemical cell under current and at operating temperature during an X-ray beam diffraction analysis of a first electrode, the cell comprising a solid electrolyte interposed between the electrodes. The device comprises: first and second interconnectors having contact faces contacting the electrodes, which allow a gas flow and exchange between the interconnectors and the electrodes. The contact face of the first interconnector allows an X-ray beam to pass to the first electrode. A thermal and atmospheric containment chamber has an inner cavity housing a stack formed from the cell between the interconnectors and a cover closing the cavity, provided with a window allowing
(Continued)

X-rays to pass through, the first interconnector being intended to be arranged facing the cover. The contact face of each interconnector is a slotted element; slotted portions of the slotted element are uniformly arranged and form 30% to 80% of the element's surface area.

14 Claims, 7 Drawing Sheets

(51) Int. Cl.
  *H01M 8/12* (2016.01)
  *G01N 23/20016* (2018.01)
  *G01N 23/20033* (2018.01)
  *C25B 1/04* (2021.01)
  *H01M 8/04537* (2016.01)

(52) U.S. Cl.
  CPC .................. *H01M 8/12* (2013.01); *C25B 1/04* (2013.01); *G01N 2223/05* (2013.01); *G01N 2223/20* (2013.01); *G01N 2223/3106* (2013.01); *G01N 2223/317* (2013.01); *G01N 2223/60* (2013.01); *H01M 8/04574* (2013.01)

(58) Field of Classification Search
  CPC ......... G01N 2223/60; G01N 23/20016; G01N 23/20033; G01N 23/207; H01M 8/04574; H01M 8/12
  See application file for complete search history.

(56) References Cited

OTHER PUBLICATIONS

International Search Report for PCT/FR2018/050782 dated Jun. 11, 2018.
Written Opinion for PCT/FR2018/050782 dated Jun. 11, 2018.

* cited by examiner

DEVICE, SYSTEM AND METHOD FOR X-RAY DIFFRACTION ANALYSIS OF AN ELECTRODE OF AN ELECTROCHEMICAL CELL, AT OPERATING TEMPERATURE AND UNDER CURRENT

CROSS-REFERENCE TO RELATED APPLICATIONS

This is a National Stage application of PCT international application PCT/FR2018/050782, filed on Mar. 29, 2018, which claims the priority of French Patent Application No. 17 52782, filed Mar. 31, 2017, both of which are incorporated herein by reference in their entireties.

TECHNICAL FIELD

The present invention relates to the field of solid oxide fuel cells (SOFC) and that of water high temperature electrolysis (HTE) or high temperature steam electrolysis (HTSE).

The invention more particularly relates to the study of electrodes of electrochemical solid oxide cells (SOC) operating at high temperature used in SOFC cells and HTE electrolysers. It enables in particular the behaviour of an electrode of a SOC electrochemical cell to be studied in operation, that is in real temperature and current conditions, in order to better know the operation of SOFC cells and HTE electrolysers.

State of Prior Art

SOFC cells and HTE electrolysers are formed by a plurality of unit electrochemical solid oxide cells (SOC) which are stacked and are electrically connected in series by means of interconnection plates, also called interconnectors. These SOC cells operate at high temperature (generally between 600° C. and 1,000° C.) and are each formed by a cathode and an anode, separated by an ion conducting electrolyte of solid oxides.

For example, in the case of water electrolysis to produce hydrogen at high temperatures (HTE mode), steam circulates at the cathode where hydrogen in gas form is generated, and a draining gas, generally air, circulates at the anode and thus collects oxygen generated in gas form at the anode.

The reversibility of electrochemical cells enables them to be operated in SOFC mode or in HTE mode as a function of the current flow direction, but different reaction mechanisms for these two operating modes cause different polarisation over-potentials or concentration over-potentials. Further, the operation in SOFC mode or HTE mode can require different architectures and microstructures to bring/discharge the reagents/reaction products. As regards degradation mechanisms, some are identical for both operating modes and others are specific to electrolysis.

In operation, any damage to the materials of electrodes and their interfaces inevitably results in a degradation in the cell electrochemical performance. Thus, developments made in recent years on materials and shaping methods used to make electrochemical cells and which enable high performance levels to be reached in SOFC mode, do not necessarily yield the same good results in HTE mode.

In order to limit these deteriorations and increase the useful life of the cells, it is essential to understand the mechanisms being involved. However, these degradation mechanisms are relatively difficult to identify and depend on test conditions (current density, steam percentage in the electrolysed $H_2O/H_2$ mixture, conversion rate, temperature, etc.).

Currently, studies on degradation mechanisms are made at the end of the use of an electrochemical cell and not during its operation. By way of example, microstructural analyses made on unit electrochemical cells are made after the operation of the system (SOFC cell or HTE electrolyser) and after the temperature decreases again. Therefore, they are not always representative of the degradations of the material in operation.

Fine electrochemical characterisations, for example by impedance spectroscopy and by voltammetry, are never associated with an on-line (in situ) monitoring of the modifications of the crystallographic structure of the electrodes studied.

Analyses performed by X-ray diffraction enable the atomic layers in crystalline materials to be detected and their spacing to be measured. They enable in particular crystalline phases to be identified and the structural arrangement and microstructure of the materials to be determined. These analyses however are not performed on the electrode material under current and thus are not always representative of the real electrode aging.

DISCLOSURE OF THE INVENTION

The invention aims at providing a device for keeping at operating temperature and under current an electrochemical cell which enables an in situ analysis of an electrode of the electrochemical cell to be made under temperature and current conditions which are those of the operation of the electrochemical cell. This device would enable the durability of a unit electrochemical cell to be studied, in particular in HTE operation.

To that end, the invention provides a device for keeping an electrochemical cell under current and at an operating temperature at least equal to 450° C. during an analysis, by X-ray beam diffraction, of a first electrode, the cell including a solid electrolyte interposed between the first electrode and a second electrode, said device comprising:

a first and a second interconnector of an electrically conducting material, the first interconnector having a contact face for contacting the first electrode and being configured to allow gas flow and exchange between the first interconnector and the first electrode, as well as a passage of an X-ray beam up to the first electrode, the second interconnector having a contact face for contacting the second electrode and being configured to allow gas flow and exchange between the second interconnector and the second electrode; and means for supplying the first and second interconnectors with current;

the device being characterised in that it further comprises:

a thermal and atmospheric containment chamber which comprises a body defining an internal cavity for housing a stack formed by the electrochemical cell sandwiched between the first and second interconnectors and which comprises a lid configured to close the cavity, said lid being provided with a window allowing X-rays to pass, the first interconnector being for being disposed in front of the lid such that X-rays passing through the window of the lid pass through the first interconnector to reach the first electrode;

means for supplying the chamber with a reactive gas;

means for discharging at least one gas from the chamber; and means for heating the cell and/or the reactive gas in the chamber at an operating temperature of the electrochemical cell;

wherein the contact face of the first interconnector is a perforated element, for example a grid, the perforated parts of which are arranged homogeneously and form from 30% to 80% of the area of the perforated element, and wherein the contact face of the second interconnector is a grooved element, for example a ribbed protrusion, adapted for distributing and/or collecting a gas.

The electrochemical cell operates under a single atmosphere, for example under air, the cell being thus supplied with one and a single reactive gas. The air has the advantage of being both a reactive gas (in that it will participate in the electrochemical reaction in the cell) and is also used as a draining gas enabling the gas produced by the electrochemical reaction to be discharged (typically oxygen generated in gas form at the anode when the first and second electrodes are oxygen electrodes and the reactive gas is air).

The electrochemical cell operates at high temperatures, that is at a temperature at least equal to 450° C., typically between 600° C. and 1,000° C.

The interconnectors are, in a known manner, electrical and fluid interconnection devices, which ensure current feed and collecting functions to an electrode, as well as gas circulation (distribution and/or collection).

These interconnectors are made of an electrically conducting material. The material chosen has to resist atmospheres which can be very reducing or oxidising at the operating temperatures of the electrochemical cell (typically between 600 and 1,000° C.), as is the case, for example, of reducing atmospheres rich in steam $H_2O/H_2$ on the cathode side of the HTE electrolysers, reducing atmospheres rich in $H_2$ on the anode side in SOFC cells, oxidising atmospheres rich in $O_2$ on the anode side in the HTE reactors and oxidising atmospheres rich in air on the cathode side in SOFC cells.

Preferably, the perforated parts of the perforated element form 65% of the area of the perforated element.

Preferably, the contact face of the first and of the second interconnector is of a chemically stable material the X-ray diffraction spectrum of which does not interfere with the X-ray diffraction pattern of the cell studied. By way of examples, the contact face of the first and of the second interconnector can be of gold or of platinum.

Preferably, the body of the chamber includes a liner, for example of aluminium, delimiting an internal volume which is packed with a heat insulator, for example a calcium silicate-based thermally insulating packing, enabling the cavity to be thermally insulating from the outside of the chamber.

Advantageously, the chamber further comprises means for cooling an external wall of the liner, for example a liquid cooling circuit disposed about the liner.

Preferably, the chamber is equipped with means for measuring a temperature of the electrochemical cell; these can be for example a thermocouple. Preferably, the lid includes a liner, for example of aluminium, delimiting an internal volume which is packed with a thermal insulator, for example a calcium silicate-based thermally insulating packing, enabling the cavity to be thermally insulating from the outside of the chamber, when the lid closes the cavity.

The lid includes a window which is permeable to X-rays and thus enables them to pass therethrough. Preferably, this window is comprised of a sheet of an X-ray permeable material having an X-ray absorption between 10% and 80% and resisting a temperature of at least 800° C.

Preferably, the device further comprises means for adjusting the distance between the first interconnector and the lid, which are designed to move the cell closer to or away from the lid by a relative displacement in translation along a central axis. These adjusting means can for example be a threaded element, such as a threaded ring, used to support the cell in the cavity of the chamber and which cooperates with the liner of the chamber such that a rotation of the threaded element about the central axis results in a translation of the cell closer to or away from the lid.

The invention also relates to an analysis system, by X-ray beam diffraction, of a first electrode of an electrochemical cell under current and at an operating temperature at least equal to 450° C. said system comprising a keeping device as described above, an X-ray source for emitting an X-ray beam and an X-ray detector for collecting the beam diffracted from the first electrode, the source being positioned such that an X-ray beam emitted from the source can pass through the window of the lid of the keeping device and reach the first electrode of the electrochemical cell and the detector being positioned so as to detect the X-ray beam diffracted by the first electrode.

Advantageously, the system further comprises means for adjusting the position of the keeping device with respect to the X-ray source and to the detector. These adjusting means enable the x, y and z position of the device, and thus of the first electrode, to be adjusted with respect to the X-ray source and to the detector. Preferably, these adjusting means are a goniometer, the keeping device being positioned on the sample holder of the goniometer.

The means for adjusting the distance between the first interconnector and the lid, discussed just above, are thus here designed to move the cell closer to or away from the lid, and herein, closer to or away from the plane of the goniometer, by a relative displacement in translation along a central axis.

Preferentially, the source and the detector belong to an X-ray diffractometer equipped with a goniometer and the device is dimensioned so as to be positioned in place of the spinner (that is the rotating sample holder) of the goniometer. It is reminded that a goniometer is an apparatus which enables successive relative angular positions to be sequentially adjusted between the X-ray source, the sample to which the X-ray beam is directed and the X-ray detector.

The invention also relates to an analysis method, by X-ray beam diffraction, of a first electrode of an electrochemical cell operating using a system as described above, said method comprising the steps of:

placing the unit cell between the first and second interconnectors, the first electrode being contacted with the contact face of the first interconnector and the second electrode being contacted with the contact face of the second interconnector;

placing the stack formed by the unit cell and the first and second interconnectors in the cavity of the containment chamber and closing the cavity using the lid, the first interconnector being disposed in front of the lid;

supplying the cell with a reactive gas;

heating the cell and/or the reactive gas in the cavity and keeping it at an operating temperature of the cell, the operating temperature being at least equal to 450° C.;

adjusting the position of the first electrode of the unit cell with respect to the X-ray source and to the X-ray detector;

supplying the cell with current;

performing an X-ray diffraction pattern of the first electrode.

Preferably, the cell is only supplied with current when the cell has reached its operating temperature.

The X-ray diffraction pattern is obtained by X-ray beam diffractometry, that is by measuring the diffraction of an X-ray beam emitted from the X-ray source, the beam passing through the window and the first interconnector to reach the first electrode and detecting, by the detector, the X-ray beam diffracted by the first electrode.

According to a preferred embodiment of the invention, the analysis method further comprises, before placing the unit cell between the first and second interconnectors, forming a first contact layer on the first electrode and a second contact layer on the second electrode, the first and second contact layers being of an electrically conducting material and having through holes, the first and second layers respectively covering from 25 to 60% of the area of the first and second electrodes.

The presence of these first and second electrically conducting layers, made directly on the first and second electrodes of the unit cell, enables a minimum contact resistance (preferably lower than 0.1 ohm·cm$^2$) to be achieved between the interconnectors and the unit cell studied, while enabling passage of the X beam (for the face facing the first interconnector) and gas circulation. These contact layers with their through holes can for example be in the form of a grid. Conventionally, a contact resistance higher than 0.3 ohm·cm$^2$ is achieved without these first and second contact layers. As a result, the presence of these first and second contact layers enables the sample to be studied under a current density representative of the operating conditions of an electrochemical cell, without generating over-potentials detrimental to the cell materials.

The first and second contact layers are of an electrically conducting material, preferably having an electrical conductivity higher than 500 S/cm, typically of gold or platinum.

They can be deposited by deposition technologies such as spraying, PVD, etc. Preferably, they are screen printed.

According to one alternative of the invention, at least the first electrode is an oxygen electrode. For example, whereas the first electrode (working electrode) is an oxygen electrode, the second electrode (counter electrode) can be of platinum. By having a first electrode of a material different from that of the second electrode, the electrochemical cell is thereby a so-called half-cell.

The first and second electrodes can also be both oxygen electrodes, the unit electrochemical cell being then a symmetrical cell with oxygen electrodes.

According to a preferred alternative of the invention, both electrodes of the cell are oxygen electrodes and the reactive gas is air. By "air", it is meant a gas mixture comprising at least 5% $O_2$ in a nitrogen or argon type neutral gas.

It is reminded that, in an electrochemical cell in operation, one of the electrodes consumes oxygen and operates in SOFC mode and the other electrode produces dioxygen $O_2$ and operates in HTE mode. The operating mode of the cell is thus chosen as a function of the current flow direction.

The device according to the invention has many advantages.

The keeping device according to the invention makes it possible to ensure the electrochemical operation of a unit cell supplied with reactive gas, for example a symmetrical cell with oxygen electrodes supplied with air, as well as its analysis by conventional electrochemical characterisation means (impedance spectroscopy and voltammetry in particular), while allowing analysis of the surface of the first electrode (operating in anodic or cathodic polarisation) by X-ray diffraction.

The invention allows a non-destructive testing of the electrochemical cell in operation. It allows in particular the in situ analysis of the degradation mechanisms of the material of the first electrode. It enables in particular the degradation mechanisms specific to the material to be identified as a function of the parameter chosen from temperature, current density and anodic or cathodic polarisation of the material (depending on the current flow direction chosen).

Further characteristics and advantages of the invention will better appear upon reading the complementary description that follows and which refers to the appended figures.

DETAILED DISCLOSURE OF PARTICULAR EMBODIMENTS

The invention enables the electrochemical operation of a unit electrochemical cell, preferably the operation under air of a symmetrical cell with an oxygen electrode to be ensured, while allowing analysis of the surface of the electrode in contact with the first interconnector (operating in anodic or cathodic polarisation) by X-ray diffraction. The analysis of the cell by conventional electrochemical characterisation means (voltammetry impedance spectroscopy in particular) remains also possible.

In other words, the invention makes it possible to fulfil the following requirements:
keeping the unit electrochemical cell at a temperature at least equal to 450° C. and under current of operation during the analysis of the electrode; aging cycles of 1,000 hours of continuous operation can in particular be kept, which enables an electrochemical characterisation of the electrode of the cell to be made in real conditions of use;
using an operating temperature of the electrochemical cell higher than 450° C., preferably between 600 and 1,000° C., for example a temperature of 800° C., while making an analysis of the first X-ray diffraction electrode.

The electrodes of the electrochemical cell, in a known manner, have to withstand the current density passing therethrough. Preferably, electrodes that can withstand a current density of at least 2 Amperes/cm$^2$ are chosen.

Of course, the electrode to be analysed (the first electrode) is chosen so as to be of a material allowing X-ray diffraction (that is of a material allowing at least 30% of an X-ray beam to pass). It is reminded that X-rays have a wavelength between approximately 0.01 nm and 10 nm ($10^{-11}$ m and $10^{-8}$ m). An oxygen electrode which allows oxygen exchange between the unit electrochemical cell and an airflow can in particular be used.

The first and second interconnectors have to allow electric contact with the electrode with which they are in contact. A material which is a proper electrical conductor (>10 S/cm) has thus to be chosen. But the chemical interactions between the material of the interconnector and its electrode have to be limited; ideally, the interconnector material should not chemically interfere with the electrode with which it is in contact. Further, the X-ray diffraction pattern peaks (obtained by X-ray diffraction) of the material of the first interconnector, should not be superimposed with the X-ray diffraction pattern peaks of the first electrode. Generally, gold or platinum is thus chosen. For reasons of costs, the structure 3 of the interconnectors is preferably made of stainless steel 316L or Inconel™ and only the part in contact with the electrode (perforated element 2 or grooved element 4) is made of gold or platinum, or any other chemically stable material the spectrum of which does not interfere with the X-ray diffraction pattern of the cell studied and the melting temperature of which is higher than 1,000° C.

Figure 1A:
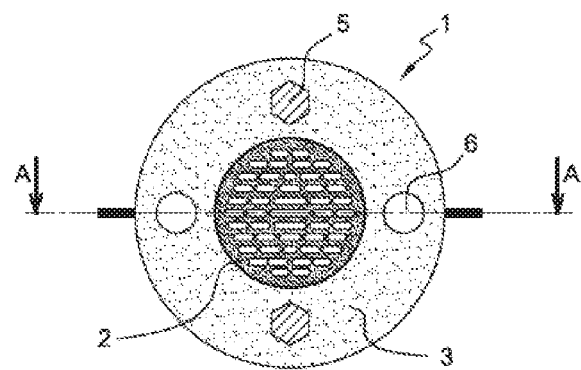
FIGS. 1a and 1b are, respectively, a top view (FIG. 1a) and a cross-section side view (FIG. 1b) along the line AA of an exemplary embodiment of a first interconnector according to the invention.
Figure 1B:
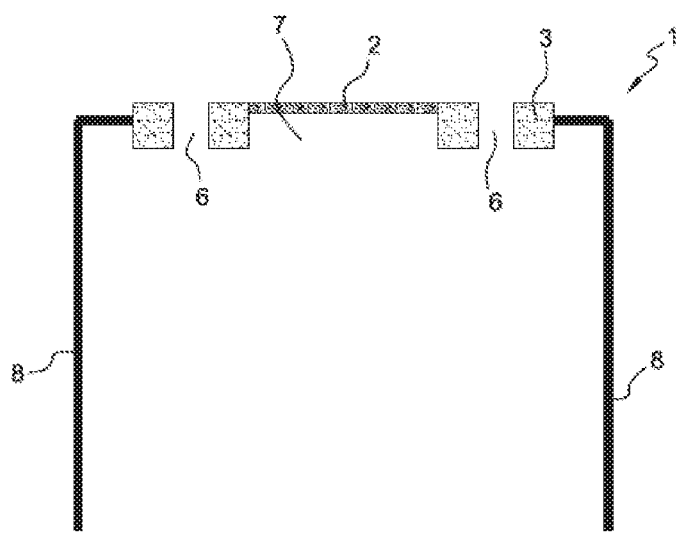

In FIGS. 1a and 1b, the first interconnector 1 for contacting the first electrode of the cell is represented. Depending on the direction of the current applied in the cell, the first electrode could be the anode (the cathode) of the cell and the first interconnector an anodic (cathodic) interconnector. The contact face of the first interconnector with the first electrode is a perforated element 2, which makes it possible to have an electric contact between the first interconnector and the first electrode, a gas flow and exchange with the first electrode of the electrochemical cell and the passage of the X-ray beam up to the first electrode at the same time. This perforated element 2 is herein a grid of gold or platinum, the characteristics of which are the following ones:
  diameter of the wires making the grid: 60 µm;
  nominal space between wires: 250 µm;
  area density: 32×32 wires per cm$^2$;
  perforated area: 65%.

Generally, 400 g/cm$^2$ are necessary to have a satisfactory contact load between a grid and an electrode. Here, to guarantee a satisfactory contact, the grid is directly deposited onto the first electrode.

The first interconnector further includes screws 5 of an electrically insulating material and resisting temperatures higher than 1,000° C., allowing assembly of the first interconnector to the second interconnector, and apertures 6, to allow gas flow.

In FIG. 1a, the location 7 for housing the cell, as well as two current supplies 8 (actually, a current input wire and a voltage measurement wire) can be seen.

Figure 2A:
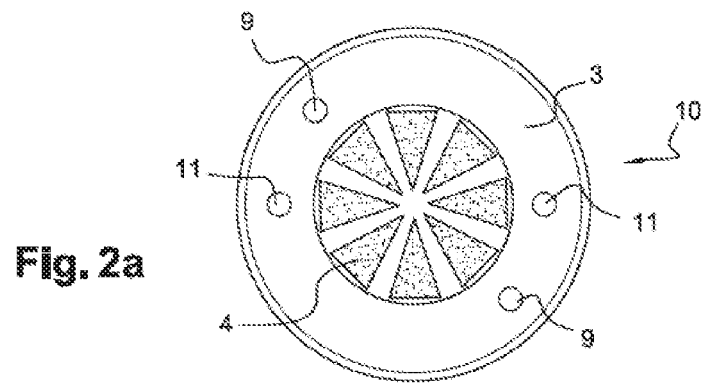
FIGS. 2a and 2b are, respectively, a top view (FIG. 2a) and a perspective side view (FIG. 2b) of an exemplary embodiment of a second interconnector according to the invention.
Figure 2B:
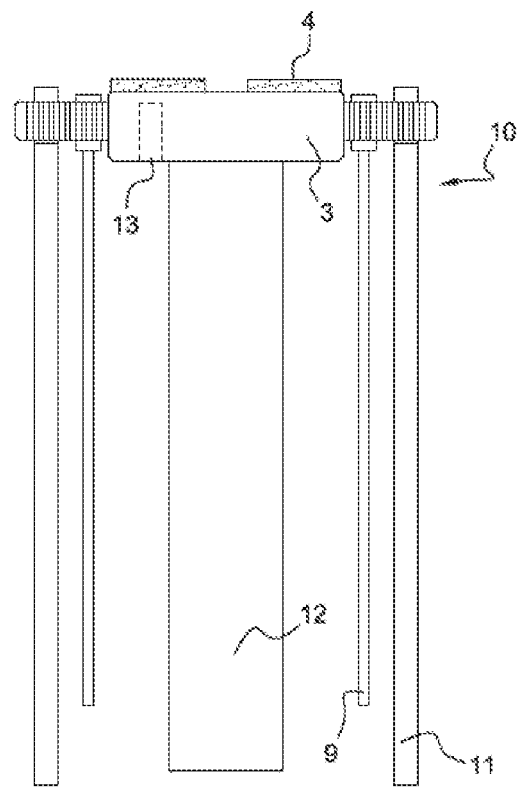

In FIGS. 2a and 2b, the second interconnector 10 is represented. Its contact face with the second electrode includes a grooved element 4, here a ribbed protrusion, which allows gas flow and exchange with the second electrode of the electrochemical cell, with which it is in contact.

The second interconnector also includes two current supplies 9 (actually, a current input wire and a voltage measurement wire) and two gas flow ducts 11 (distribution for the first one (reactive gas) and collection for the other (draining gas and gases produced by the electrochemical reaction)), a housing 12 for the means for heating the reactive gas and/or the cell in the chamber and a housing 13 (represented in doted lines in FIG. 2b) for the means for measuring the cell temperature.

The gas flow ducts 11 are for example made of inox 316.

Figure 3:
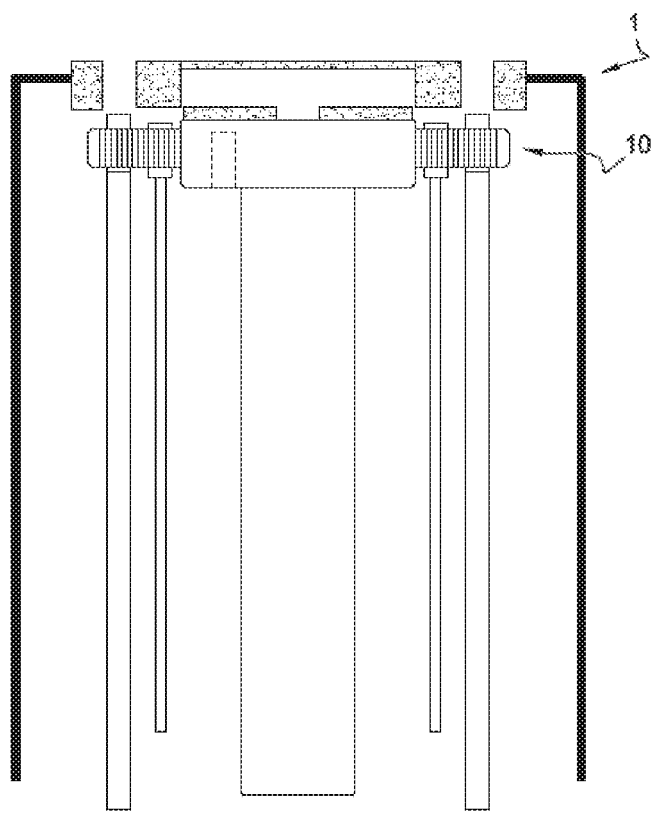
FIG. 3 is a schematic representation of the first and second interconnectors once they are assembled. The representation of FIG. 1b, for the first interconnector, and that of FIG. 2b for the second interconnector are used again, respectively.

In order to keep the contact, on the one hand, between the first interconnector 1 and the first electrode and, on the other hand, between the second interconnector 10 and the second electrode, the cell (not represented) is placed between both interconnectors (location 7) and the same are then assembled (FIG. 3). The assembly of the interconnectors can be ensured by two screws of alumina ($Al_2O_3$) (reference 5 in FIG. 1, but not represented in FIG. 3) ensuring electric insulation between both interconnectors and providing an excellent heat resistance.

According to a preferred embodiment of the invention, a first and a second contact layer are respectively deposited onto the first and the second electrode of the electrochemical cell. These contact layers are for example screen printed on the electrodes at operating temperature and under the atmosphere of study of the cell and are typically of gold or platinum. The conductive material of the first and second contact layers has to be evenly distributed on the entire surface of the first and the second electrode to ensure a proper distribution in the current lines, while having through holes enabling circulation for the gases produced, as well as passage for the X beam for the first electrode facing the first interconnector. That is why each contact layer covers between 25 and 60% of the area of the electrode on which it is deposited.

The through holes are configured to allow gas flow homogeneously on the entire electrochemical cell and allow the X beam to reach the cell along at least the displacement axis of the beam, preferably with an angle ranging from 20 to 160° with respect to the plane formed by the surface of the first electrode.

An example of contact layers is a screen printed gold grid, comprised of horizontal and vertical lines with a width of 500 µm, which are spaced from each other by 500 µm in the horizontal direction and by 300 µm in the vertical direction. Through holes having the shape of rectangles of 300 µm×500 µm, which are accessible by the X beam are thus obtained. By orienting the beam in the direction of the larger side of the rectangles, incident angles are permitted in a range as wide as possible (20 to 160° C.). The deposition thickness of the contact layers is chosen so as to achieve a sufficient contact with the electrode (that is a thickness of at least 200 nm) and enable the X beam to reach the electrode. The maximum thickness is for example calculated such that an incident X beam with an angle of 20 and 160° is able to reach the sample material (that is a thickness typically of 2 µm).

In FIG. 3, the interconnectors assume a Kelvin type measurement configuration (4-point measurement), that is two current input wires and two voltage measurement wires are provided, in order to be able to perform four-wire electrochemical measurements.

Figure 4:
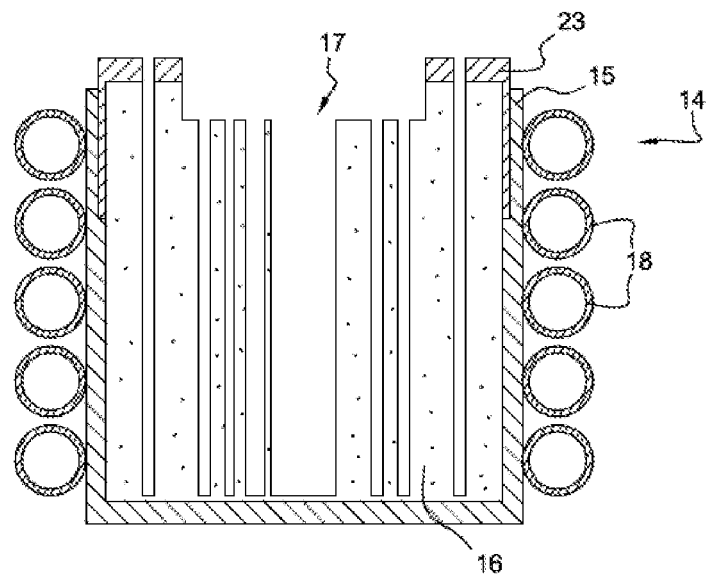
FIG. 4 is a cross-section side view of an exemplary embodiment of a thermal and atmospheric containment chamber according to the invention.

In FIG. 4, the thermal and atmospheric containment chamber 14 is represented. It includes a liner 15 which delimits an internal space which is packed with a heat insulator 16 so as to define a cavity 17 for housing the electrochemical cell.

Means 18 for cooling the external wall of the liner 15 are disposed about the chamber. For example, these cooling means 18 are a closed circuit cooling liquid circulation which surrounds the chamber, such that the temperature difference between the temperature inside the chamber and the temperature outside the chamber is at least 750° C. Indeed, above 50° C., the X-ray source and the detector might be damaged.

In this exemplary embodiment, the chamber 14 also includes a threaded ring 23 which cooperates with a corresponding thread located on the liner 15 of the body of the chamber. By rotating the threaded ring 23 about a central axis passing through the first and second interconnectors 1 and 10, the distance between the first electrode of the cell 2 and the plane of the goniometer can be adjusted, in order to move the first electrode of the cell closer to the window of the lid.

Figure 5A:
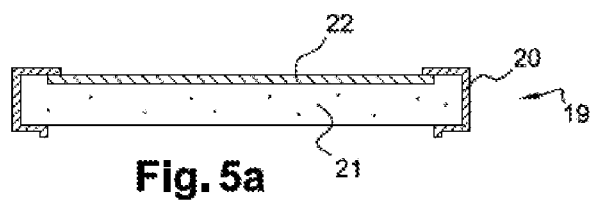
FIGS. 5a and 5b are, respectively, a cross-section side view (FIG. 5a) and a top view (FIG. 5b) of an exemplary embodiment of a lid according to the invention.
Figure 5B:
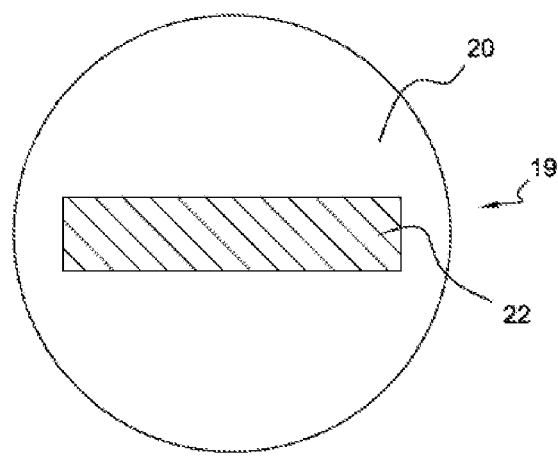

The lid 19 enables the atmosphere to be contained inside the chamber 14, while ensuring a thermal barrier with the outside. It can for example be comprised of a liner 20 the inside part of which is lined with a heat insulator 21 (FIG. 5a).

The heat insulators 16 and 17 used in the chamber should resist the temperature of use of the electrochemical cell, without emitting pollutants by gas release. In this exemplary embodiment, the temperature of use of the electrochemical cell is intended to be 800° C. The liner 15 forming the body of the chamber and the liner 20 forming the lid 19 can thus for example be made of aluminium and the heat insulators 16 and 17 can be based on calcium silicate, for example of Duratec™ 750 or Duratec™ 1,000.

The lid 19 includes a window 22 the function of which is to allow the passage of an X-ray beam, while preserving thermal and atmospheric containment of the chamber. The window 22 should thus be of a low absorbance to X-rays. Preferably, it is designed to allow the passage of X-rays at angles higher than 20°.

The window 22 for passing X-rays should resist the operating temperature of the unit electrochemical cell (in our example, 800° C.) without emitting pollutants by gas release. Further, it is preferable that it is inert in an oxidising or reducing atmosphere.

Finally, the window for passing X-rays should enable heat losses by convection to be avoided at maximum, while being able to make X-ray diffraction patterns.

In our exemplary embodiment, the lid 19 includes a liner 20 of aluminium, the inside part of which is packed with Duratec™ 1,000 and the window for passing X-rays is made of a graphite sheet (purity of 99.9% atomic) with a thickness of 250 μm. The signal mitigation factor is thus 0.35. Beryllium could also be used in place of graphite.

Figure 6:
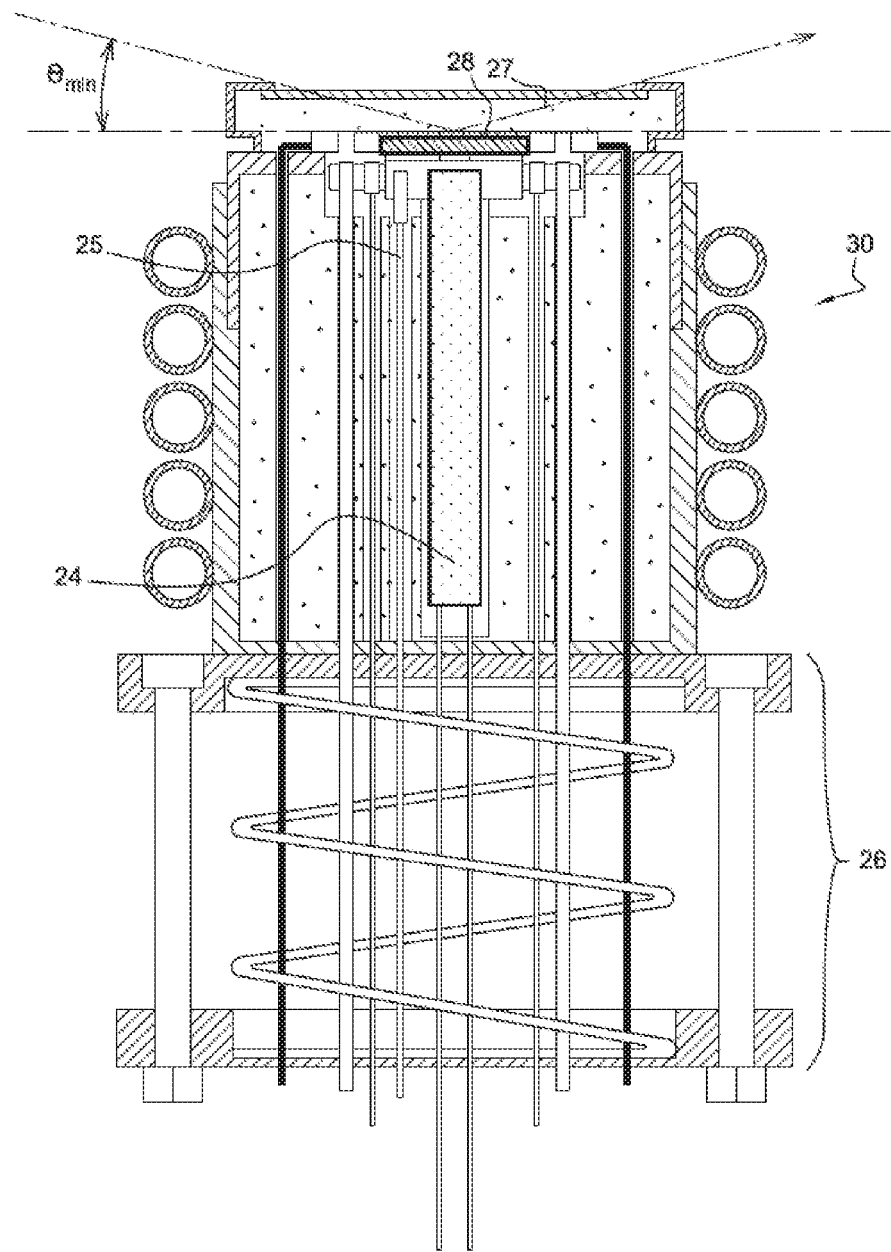
FIG. 6 is a side view of an exemplary embodiment of a keeping device according to the invention.

In FIG. 6, an exemplary embodiment of the keeping device 30 according to the invention is represented.

The unit electrochemical cell 28 has been placed between the first and second interconnectors 1 and 10.

Means 24 for heating the reactive gas and/or the cell in the chamber at an operating temperature of the electrochemical cell have been inserted in the housing 12. It is preferable to choose a compact reliable element that can withstand area thermal powers in the order of 30 Watts/cm². The heating means 24 are herein a high power heating cartridge of boron nitride (diameter: 10 mm; length: 40 mm; power: 150W; voltage: 230V; cable length: 250 mm). The heating cartridge is preferably embedded in strongly compressed magnesia protected by a stainless steel (stainless steel 316 or Inconel™) shielding and the output is made on ceramic beaded wires. The cartridge is in contact with the second interconnector and thus will heat it by heat conduction, as well as the gas(es) contained in the flow ducts 11. The heating means 24 thus enable to heat both the reactive gas and the cell.

Means 25 for measuring the temperature of the electrochemical cell have been inserted in the housing 13. These can for example be a chromel/alumel K type thermocouple.

Preferably, the means for supplying the chamber with a reactive gas, that is the apertures 6 in the first interconnector and the flow ducts 11 in the second interconnector, as well as the perforated parts of the perforated element of the first interconnector and the groove(s) of the grooved element of the second interconnector, are disposed so as to achieve an homogeneous and symmetrical distribution in the reactive gas on the electrochemical cell.

Preferably, the chamber is supplied with a constant gas flow of reactive gas.

In this exemplary embodiment, the keeping device 30 is equipped with means 26 enabling the position of the keeping device to be adjusted with respect to the X-ray source and the detector. These adjusting means 26 can for example be a micrometric positioning table equipped with knobs allowing translation along the direction x, translation along the direction y and translation along the direction z.

Figure 7:
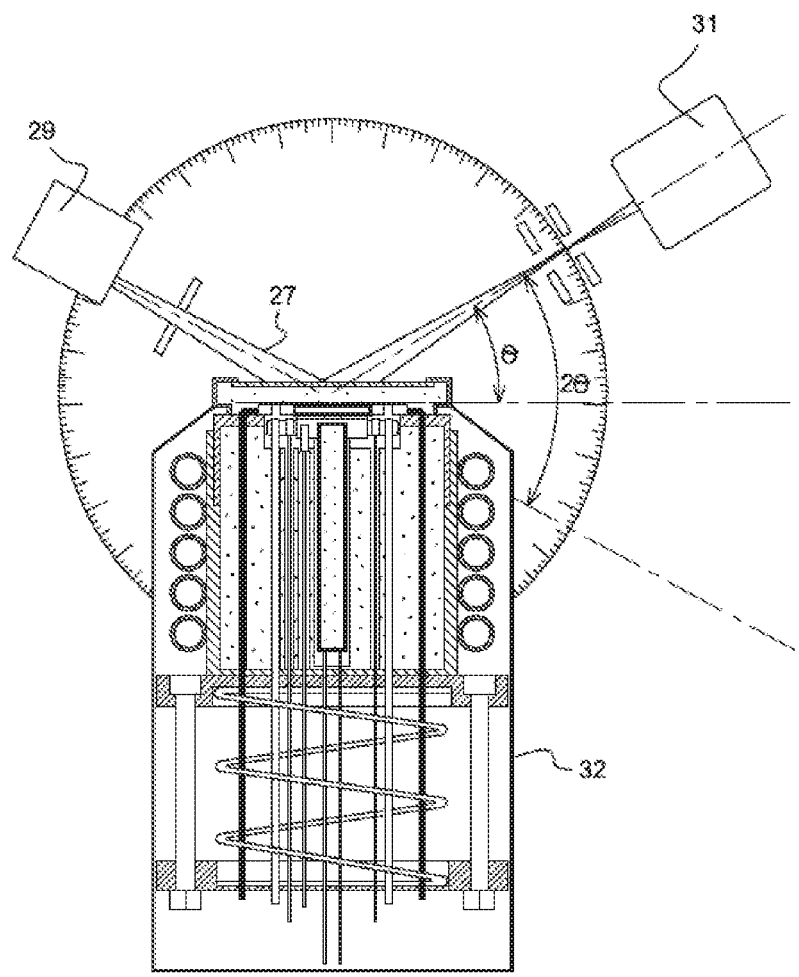
FIG. 7 is a schematic representation of an exemplary embodiment of the analysis system according to the invention.

An X-ray diffractometer generally includes a device, called a goniometer, which allows a synchronous rotation of the X-ray source 29 and the X-ray detector 31 about an axis passing through the plane of the sample. A Bragg-Brentano geometry goniometer with a configuration (θ-θ) is generally used, in which the sample-detector distance remains constant whatever the angle. In FIG. 7, a graduated circle marks the diffraction angles attached to the goniometer of the diffractometer.

The keeping device according to the invention can be designed to be adapted to the goniometer of a diffractometer, for example a D8 type diffractometer from Bruker, in place of the original spinner of the goniometer. The location of the spinner (rotating sample holder) is symbolised by reference 32 in FIG. 7. To make sure that the keeping device can take the place of the goniometer spinner, its maximum bulk should correspond to the spinner dimensions. Its maximum bulk should be generally contained in a cylinder of 20 cm in height for 10 cm in diameter.

To perform an X-ray diffraction pattern, the X-ray source 29 (generally a copper tube) which emits an X-ray beam 27 on the sample to be characterised is used. The beams diffracted are collected by the detector 31. The focusing circles pass through the source 29, the detector 31 and are always tangent to the sample. The latter should therefore rotate about its axis such that it always makes an angle θ with the X-ray beam.

This angle is thus different at each angular position.

To illustrate the invention, an X-ray diffraction pattern has been made on a symmetrical unit electrochemical cell with oxygen electrodes using the keeping device as described above.

For oxygen electrodes, two electrodes of strontium doped lanthanum iron-cobaltites of the general formula $La_{1-x}Sr_xCo_{1-y}Fe_yO_{3-\sigma}$ (LSCF), here two electrodes of $La_{0.8}Sr_{0.2}Co_{0.2}Fe_{0.8}O_{2.9}$, disposed on either side of a solid electrolyte of yttrium stabilised zirconium oxide (YSZ), here $Y_{1.2}Zr_{0.6}O_3$ have been chosen.

The chamber has been supplied with air with a constant gas flow with an average flow rate of 0.5 L/min and the cell has been heated at a temperature of 800° C. for a duration of 150 h.

Figure 8:
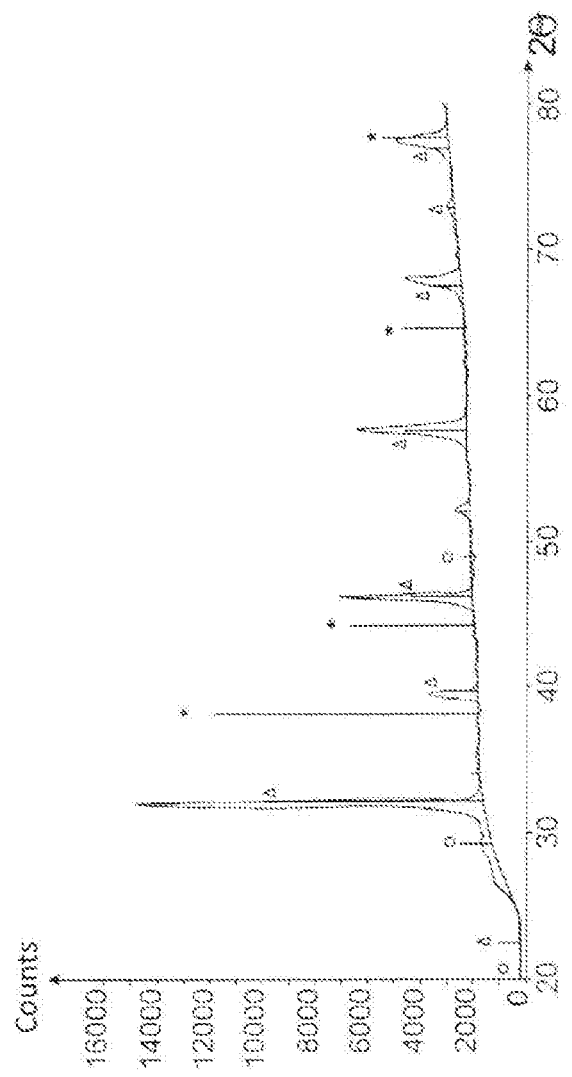
FIG. 8 is an X-ray diffraction pattern of a sample obtained with the analysis system according to the invention.

On the graph of FIG. 8, it is noticed that peaks from gold of the grid of the first interconnector (peaks marked by the symbol *) do not interfere with those of the first electrode (or the second electrode) (marked by the symbol Δ) or those of the solid electrolyte (marked by the symbol o).

What is claimed is:

1. A device for keeping an electrochemical cell under current and at an operating temperature at least equal to 450° C. during an analysis, by X-ray beam diffraction, of a first electrode, the cell including a solid electrolyte interposed between the first electrode and a second electrode, the device comprising:
a first and a second interconnector of an electrically conducting material, the first interconnector having a contact face for contacting the first electrode and being configured to allow gas flow and exchange between the first interconnector and the first electrode, as well as a passage of an X-ray beam up to the first electrode, the second interconnector having a contact face for contacting the second electrode and being configured to allow gas flow and exchange between the second interconnector and the second electrode; and
means for supplying the first and second interconnectors with current;
wherein the device further comprises:
a thermal and atmospheric containment chamber which comprises a body defining an internal cavity for housing a stack formed by the electrochemical cell sandwiched between the first and second interconnectors and which comprises a lid configured to close the cavity, the lid being provided with a window allowing X-rays to pass, the first interconnector being for being disposed in front of the lid such that X-rays passing through the window of the lid pass through the first interconnector to reach the first electrode;
means for supplying the chamber with a reactive gas;
means for discharging at least one gas from the chamber; and
means for heating the cell and/or the reactive gas in the chamber at an operating temperature of the electrochemical cell, this operating temperature being at least equal to 450° C.;
wherein the contact face of the first interconnector is a perforated element, the perforated parts of which are arranged homogeneously and form from 30% to 80% of the area of the perforated element;
wherein the contact face of the second interconnector is a grooved element, adapted for distributing and/or collecting a gas.

2. The device according to claim 1, wherein the body of the chamber includes a liner delimiting an internal volume which is packed with a heat insulator enabling the cavity to be thermally insulating from the outside of the chamber.

3. The device according to claim 2, wherein the chamber further comprises means for cooling an external wall of the liner.

4. The device according to claim 3, wherein the means for cooling an external wall of the liner are a liquid cooling circuit disposed around the liner.

5. The device according to claim 1, wherein the window of the lid is made of graphite.

6. The device according to claim 1, further comprising means for adjusting the distance between the first interconnector and the lid, designed to move the cell closer to or away from the lid by a relative displacement in translation along a central axis.

7. The device according to claim 6, wherein the means for adjusting the distance are a threaded element used to support the cell in the cavity of the chamber and which cooperates with the liner of the chamber such that a rotation of the threaded element about the central axis results in a translation of the cell closer to or away from the lid.

8. An analysis system, by X-ray beam diffraction, of a first electrode of an electrochemical cell under current and at an operating temperature at least equal to 450° C., the analysis system comprising a device as described in claim 1, an X-ray source for emitting an X-ray beam and an X-ray detector for collecting the beam diffracted from the first electrode, the source being positioned such that an X-ray beam emitted from the source can pass through the window of the lid of the device and reach the first electrode of the electrochemical cell and the detector being positioned so as to detect the X-ray beam diffracted by the first electrode.

9. The system according to claim 8, further comprising means for adjusting the position of the device with respect to the X-ray source and to the detector.

10. The system according to claim 9, wherein the means for adjusting the position of the device are a goniometer, the device being positioned on the sample holder of the goniometer.

11. An analysis method, by X-ray beam diffraction, of a first electrode of an electrochemical cell operating using a system according to claim 8, the analysis method comprising the steps of:
placing the unit cell between the first and second interconnectors, the first electrode being contacted with the contact face of the first interconnector and the second electrode being contacted with the contact face of the second interconnector;
placing the stack formed by the unit cell and the first and second interconnectors in the cavity of the containment chamber and closing the cavity using the lid, the first interconnector being disposed in front of the lid;
supplying the cell with a reactive gas;
heating the cell and/or the reactive gas in the cavity and keeping it at an operating temperature of the cell, the operating temperature being at least equal to 450° C.;
adjusting the position of the first electrode of the unit cell with respect to the X-ray source and to the X-ray detector;
supplying the cell with current;
performing an X-ray diffraction pattern of the first electrode.

12. The analysis method according to claim 11, further comprising, before placing the unit cell between the first and second interconnectors, forming a first contact layer on the first electrode and a second contact layer on the second electrode, the first and second contact layers being of an electrically conducting material and having through holes, the first and second layers respectively covering from 25 to 60% of the area of the first and second electrodes.

13. The analysis method according to claim 12, wherein both electrodes are oxygen electrodes and the reactive gas is air.

14. The analysis method according to claim 11, wherein at least the first electrode is an oxygen electrode.

* * * * *